United States Patent
Nishikawa et al.

[11] Patent Number: 5,461,505
[45] Date of Patent: Oct. 24, 1995

[54] POLYGON MIRROR

[75] Inventors: Yukio Nishikawa, Ikeda; Yuji Uesugi, Osaka, both of Japan

[73] Assignee: Matsushita Electric Industrial Co., Ltd., Osaka, Japan

[21] Appl. No.: 162,324

[22] Filed: Dec. 7, 1993

[30] Foreign Application Priority Data

Dec. 8, 1992 [JP] Japan ................... 4-327762

[51] Int. Cl.⁶ ................................. G02B 26/08
[52] U.S. Cl. .................... 359/216; 359/217; 359/218
[58] Field of Search ..................... 359/849, 855, 359/865, 872, 212, 216–220

[56] References Cited

U.S. PATENT DOCUMENTS

| | | | |
|---|---|---|---|
| 3,117,178 | 1/1964 | Webber | 359/855 |
| 3,529,884 | 4/1968 | Ives et al. | |
| 4,043,632 | 8/1977 | Jeffrey et al. | 359/217 |
| 4,141,620 | 2/1979 | Goshima et al. | 359/200 |
| 4,156,556 | 5/1979 | Klein et al. | 359/872 |
| 4,268,110 | 5/1981 | Ford | 359/216 |
| 5,124,830 | 6/1992 | Omura et al. | 359/219 |
| 5,134,514 | 7/1992 | Murakoshi et al. | 359/216 |

FOREIGN PATENT DOCUMENTS 2-173718  7/1990  Japan .

*Primary Examiner*—Paul M. Dzierzynski
*Assistant Examiner*—Steve Kong
*Attorney, Agent, or Firm*—Wenderoth, Lind & Ponack

[57] ABSTRACT

A polygon mirror includes a polygon base having a plurality of attaching surfaces, a plurality of base plates each of which is fixed to each of the attaching surfaces of the base and has a reflecting surface for reflecting a laser beam, a plurality of total reflection mirrors each of which is fixed onto each of the base plates, and a reflecting direction adjusting mechanism. The reflecting direction adjusting mechanism connects the base to the base plate for the adjustment of a direction along which the laser beam is reflected by the reflecting surface of the total reflection mirror with respect to the attaching surface of the base.

12 Claims, 6 Drawing Sheets

POLYGON MIRROR

BACKGROUND OF THE INVENTION

The present invention relates to a polygon mirror for scanning lights such as laser beams.

FIG. 11 shows a conventional polygon mirror, and in particular an octahedron mirror, having a reflecting surface 11 and a shaft-mounting hole 12. Glass or metal is cut to form the polygon mirror.

However, it is difficult to manufacture a large polygon mirror such as a polygon mirror for a processing laser.

In order to solve the above problem, as disclosed in the Japanese Laid-open Publication No. 2-173718 and shown in FIG. 12, a glass plate 14 with a total reflection coating is attached to its peripheral portion of a metal polygonal base 13 via a silicon rubber adhesive agent 15. The base 13 includes a mounting hole 5. The above polygon mirror is large in size and is easily manufactured.

However, since the polygon mirror is manufactured by attaching the glass plate 14 to the base 13, it is impossible to adjust a direction along which a laser beam is reflected by the reflecting surface of the glass plate 14 with respect to the attaching surface of the base 13 after assembly. When a part of the reflecting surface is damaged, it is difficult to repair the part thereof, and then, the polygon mirror should be exchanged for a new one.

SUMMARY OF THE INVENTION

Accordingly, an object of the present invention is to provide a polygon mirror for which a direction along which a laser beam is reflected by the reflecting surface of a total reflection mirror thereof with respect to the attaching surface of a base can be adjusted even after manufacturing, and for which the reflecting surface of the total reflection mirror can be replaced by a reflecting surface of a new total reflection mirror.

In accomplishing these and other objects, according to one aspect of the present invention, there is provided a polygon mirror comprising: a polygon base having a plurality of attaching surfaces; a plurality of base plates each of which is fixed to each of the attaching surfaces of the base and has a reflecting surface for reflecting a laser beam; a plurality of total reflection mirrors each of which is fixed onto each of the base plates; and a reflecting direction adjusting mechanism which connects the base to the base plate so as to adjust a direction along which the laser beam is reflected by the reflecting surface of the total reflection mirror with respect to the attaching surface of the base.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
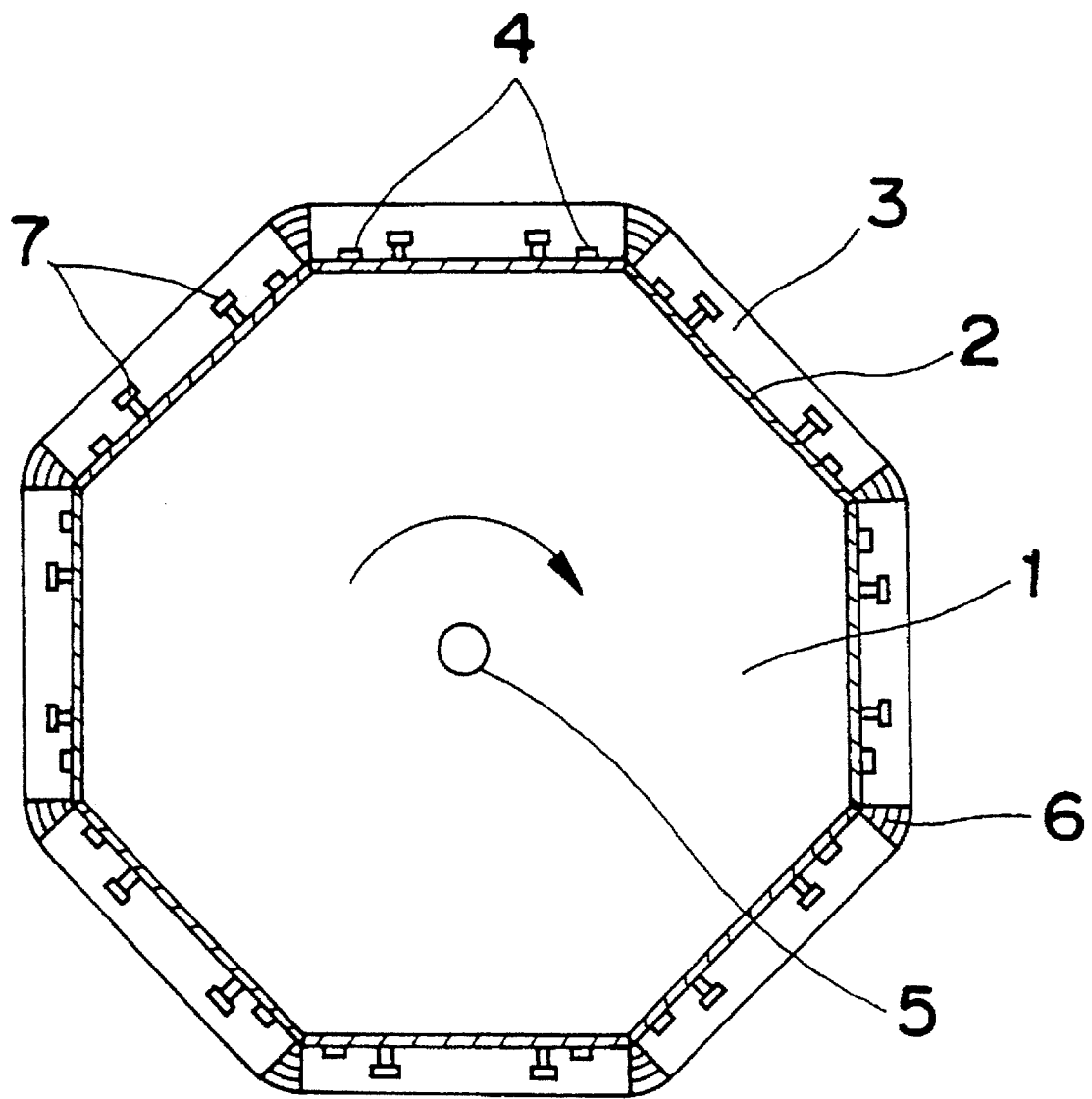
FIG. 1 is a plan view showing a polygon mirror according to a first embodiment of the present invention.

Before the description of the present invention proceeds, it is to be noted that like parts are designated by like reference numerals throughout the accompanying drawings.

Figure 2:
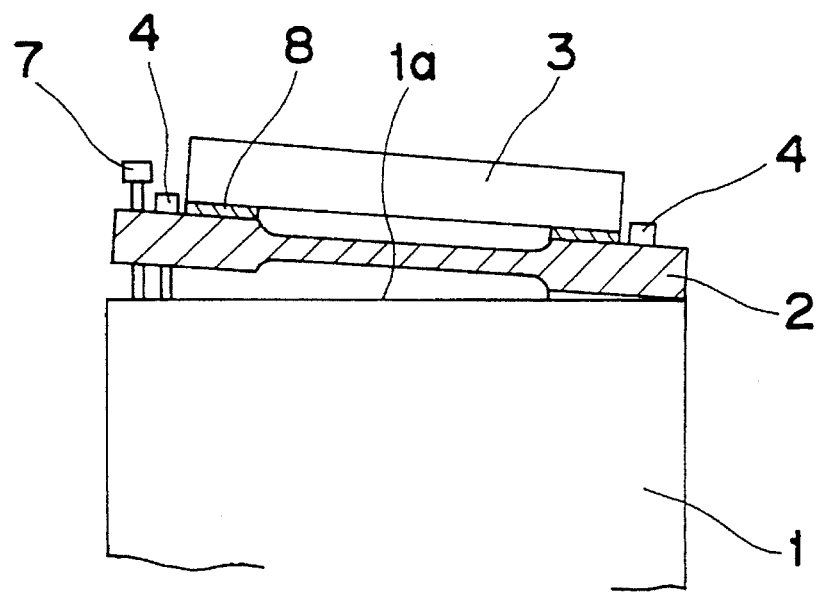
FIG. 2 is a cross-sectional side view of the polygon mirror in FIG. 1.

A polygon mirror according to a first embodiment of the present invention will be described below with reference to FIGS. 1 and 2. FIG. 1 shows the polygon mirror. FIG. 2 shows a cross-sectional side view of the polygon mirror viewed from a direction perpendicular to the reflecting surface of a total reflection mirror 3. In FIG. 1, an octahedron base 1 has eight attaching surfaces 1a and is made of lightweight metal such as aluminum. A base plate 2 is fixed to each attaching surface 1a of the base 1. The total reflection mirror 3 is attached to the base plate 2 via an adhesive agent 8 as shown in FIG. 2 or two fixing members 23 as shown in FIGS. 5–8. Reference numeral 4 denotes a fixing bolt for fixing the base plate 2 to the attaching surface 1a of the base 1, 5 denotes a shaft-mounting hole for fixedly mounting a shaft for rotating the polygon mirror, 6 denotes a triangle boundary member of metal fixed to a boundary portion between the adjacent total reflection mirrors 3, and 7 denotes a reflecting direction adjusting bolt for adjusting a direction along which a laser beam is reflected by the reflecting surface of the total reflection mirror 3 with respect to the attaching surface of the base 1.

Figure 6:
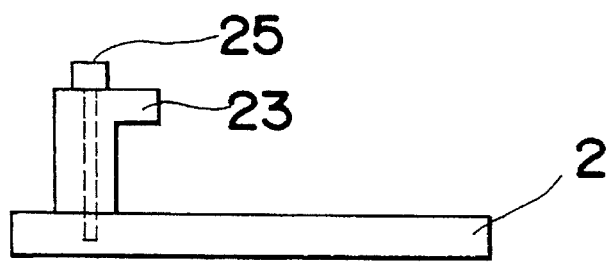
FIG. 6 is an enlarged side view of the fixing member fixed to the base plate.
Figure 7:
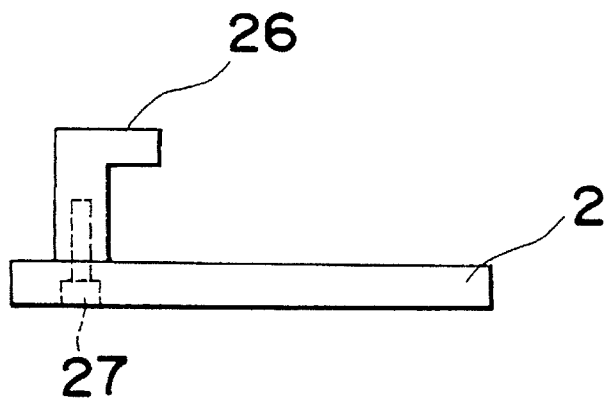
FIG. 7 is an enlarged side view of another fixing member fixed to the base plate.

FIGS. 6 and 7 show two kinds of fixing members 23 and 26 for fixing the total refection mirror 3 to the base plate 2. That is, in FIG. 6, the inverted L-shaped fixing member 23 is fixed to the base plate 2 with a bolt 25 inserted from the fixing member side. In FIG. 7, the inverted L-shaped fixing member 26 is fixed to the base plate 2 with a bolt 27 inserted from the base plate side.

Upon manufacture, first, the eight total reflection mirrors 3 are attached to the eight base plates 2 via the adhesive agent 8 or the two fixing members 23. Then, the base plates 2 are fixed to the attaching surfaces 1a of the base 1 by the four fixing bolts 4 while the ends of the two reflecting direction adjusting bolts 7 are brought in contact with the attaching surfaces 1a of the base 1 through holes 2a of the base plates 2. Normally, only one of the two reflecting direction adjusting bolts 7 is rotated to perform the adjustment. The adjusting bolts 7 are screwed into the base plate 2, so that the rotation of the adjusting bolts 7 changes the distance between the base plate 2 and the base 1 to incline the base plate 2 to the attaching surface 1a of the base 1.

Figure 3:
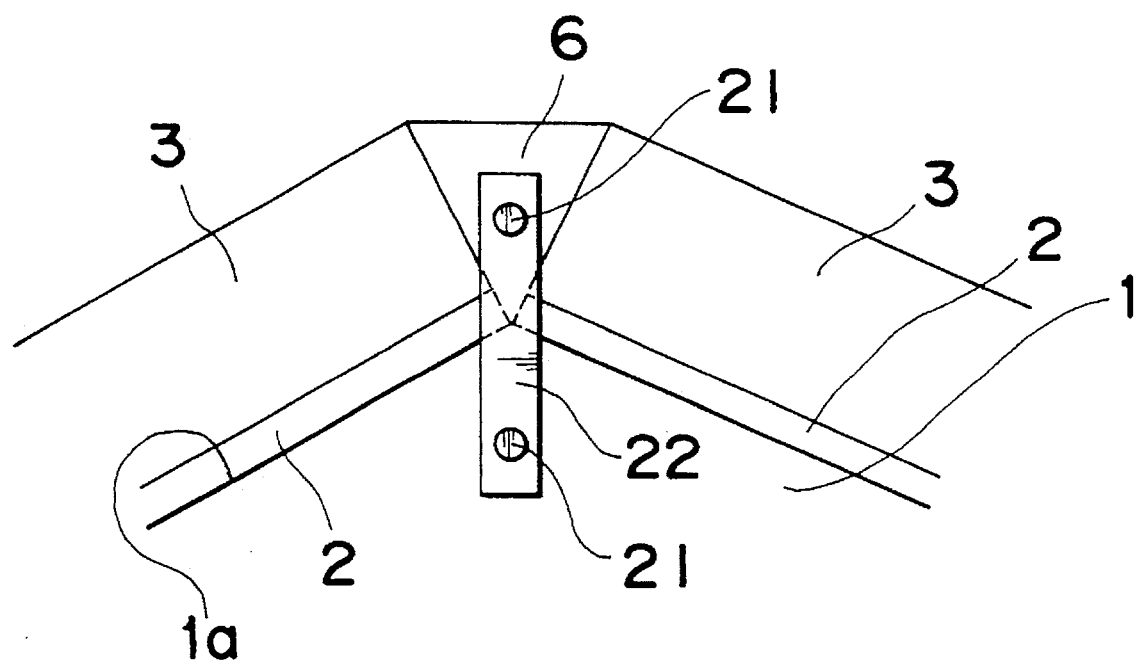
FIG. 3 is a partial plan view of the polygon mirror showing the attachment of a boundary member and the base.
Figure 4:
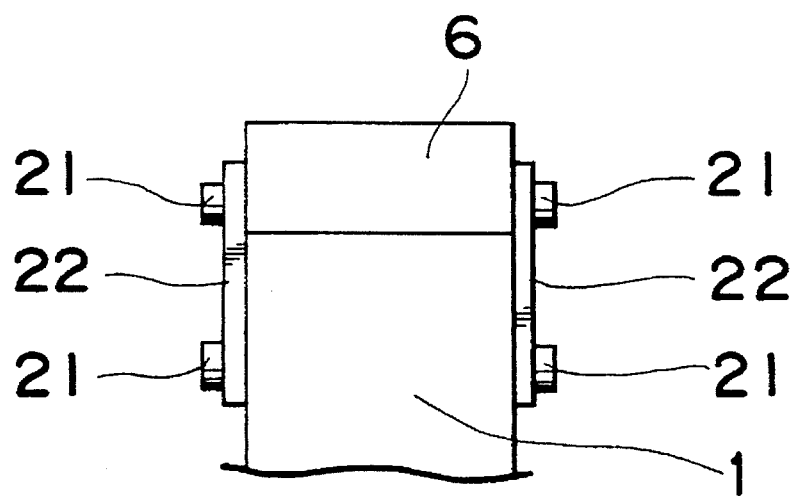
FIG. 4 is a partial side view of the polygon mirror shown in FIG. 3.
Figure 5:
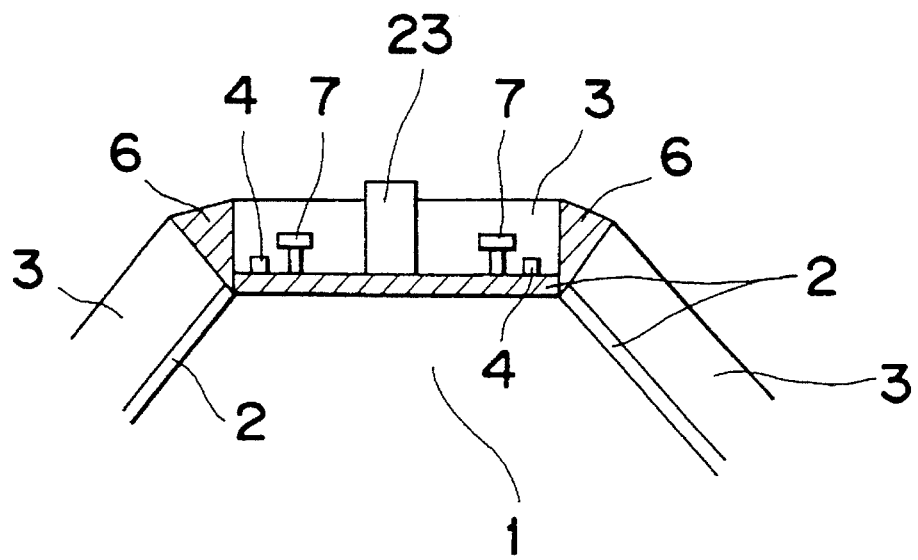
FIG. 5 is a partial plan view of the polygon mirror showing a fixing member.
Figure 8:
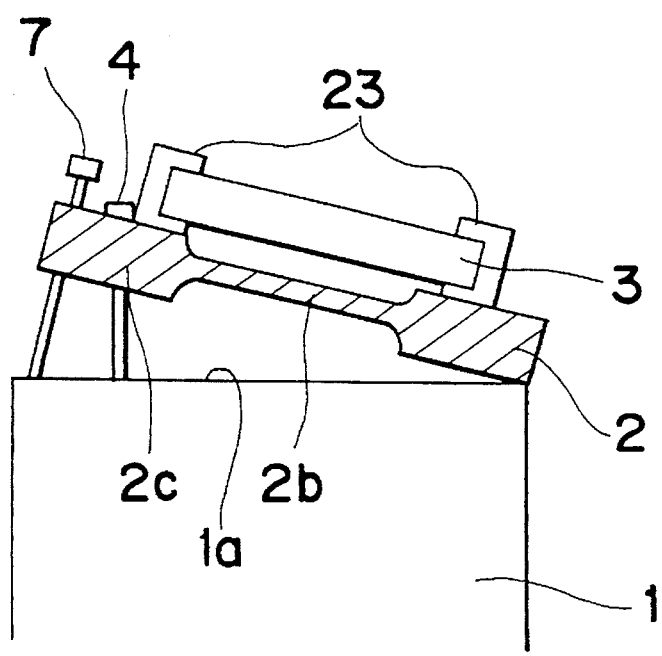
FIG. 8 is an enlarged side view, in part, of the polygon mirror shown in FIG. 2.
Figure 9:
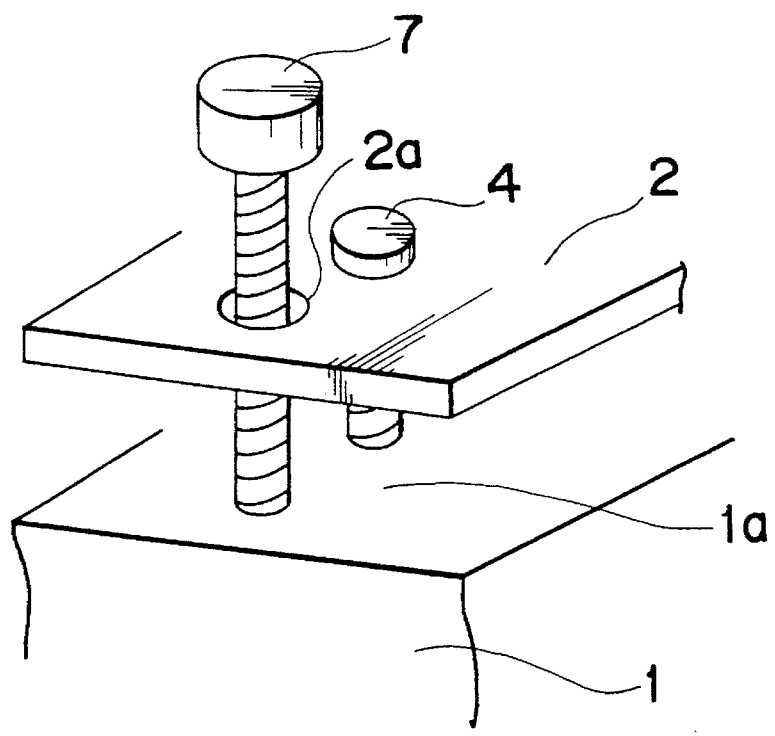
FIG. 9 is a perspective view showing a reflecting direction adjusting bolt.
Figure 11:
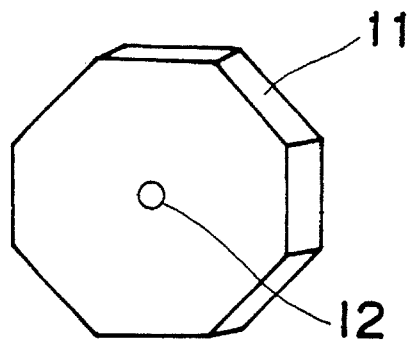
FIG. 11 is a perspective view showing a conventional polygon mirror.
Figure 12:
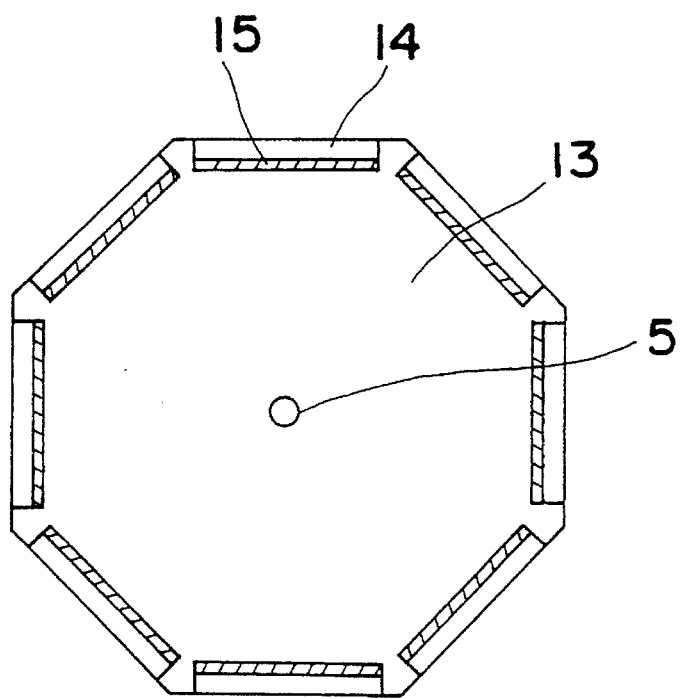
FIG. 12 is a plan view showing another conventional polygon mirror.

Then, each of the boundary members 6 is fitted so as to contact the adjacent end surfaces of the total reflection mirrors 3, and then fixed to the base 1 via two fixing plates 22 with bolts 21 as shown in FIGS. 3 and 4. The reflecting direction along which a laser beam is reflected by the reflecting surface of the total reflection mirror 3 can be adjusted with respect to the attaching surface 1a of the base 1 by rotating the adjusting bolts 7 after the fixing bolts 4 are loosened. That is, the rotation of the adjusting bolts 7 makes the base plate 2 incline relative to the attaching surface 1a of the base 1 and then causes the distance between the attaching surface 1a of the base 1 and the base plate 2 via the bolts 7 to be adjusted as shown in FIGS. 8 and 9 so that the direction can be a direction perpendicular to the reflecting surface of the total reflection mirror 3. After adjusting, the fixing bolts 4 are again screwed so as to fix the base plates 2 to the attaching surfaces 1a of the base 1.

The thickness at the middle 2b of the base plate 2 is smaller than that at the peripheral portion 2c thereof, such that when the total reflection mirror 3 is fixed to the base plate 2 and the surface of the middle 2b is parallel to the outer peripheral portion of the base 1, the surface of the middle 2b is spaced from base 1 by a specified amount such as 1 mm or more. This results in reduced surface distortion of the total reflection mirror 3 which might be caused by the base plate 2. When elastic material such as silicon rubber is used as the adhesive agent 8 for fixing the total reflection mirror 3 to the base plate 2, distortion can be more reduced because of absorption of the rubber.

Figure 10:
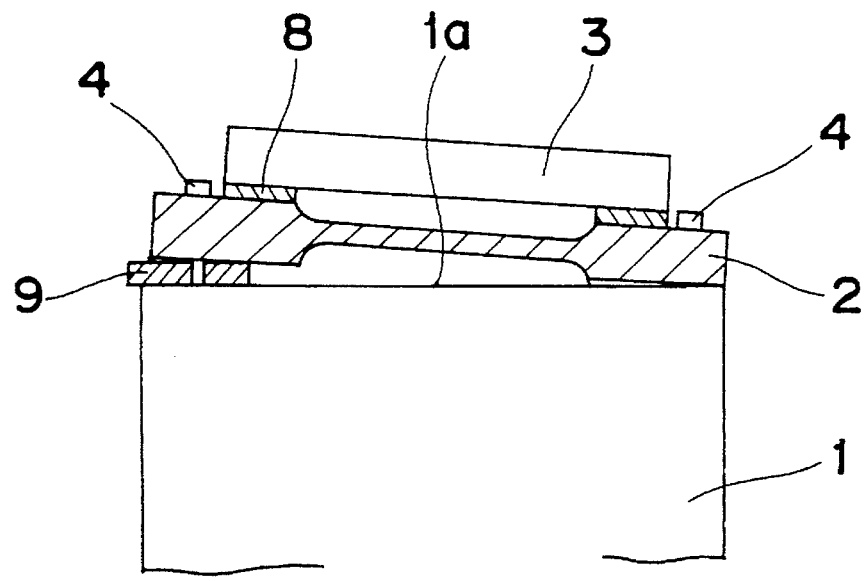
FIG. 10 is a cross-sectional side view of a polygon mirror according to the second embodiment of the present invention.

FIG. 10 shows another polygon mirror according to the second embodiment of the present invention. The reflecting direction can be correctively adjusted by, instead of rotating the adjusting bolts 7, interposing a thin plate 9 between the base 1 and the base plate 2 to fix the thin plate 9 between the base 1 and the base plate 2.

According to the embodiments, the direction along which a laser beam is reflected by the reflecting surface of the total reflection mirror 3 can be correctively adjusted with respect to the attaching surface 1a of the base 1 by either rotating the adjusting bolts 7 or interposing the thin plate 9 between the base 1 and the base plate 2 even after manufacturing. After the fixing bolts 4 are loosened to allow for the adjustment of the reflecting direction after manufacturing, it is easy to exchange the reflecting surface of the total reflection mirror 3 for a reflecting surface of a new total reflection mirror 3.

In the embodiments, the configuration of the base 1 is not limited to octahedron, but can be any polygonal shape.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A polygon mirror comprising:

a polygon base having a plurality of attaching surfaces;

a plurality of base plates mounted to said attaching surfaces, respectively, of said base;

a plurality of total reflection mirrors fixed onto said base plates, respectively, each of said total reflection mirrors having a reflecting surface;

a reflecting direction adjusting mechanism for inclining one of said base plates relative to the one of said attaching surfaces to which said one of said base plates is mounted; and wherein said one of said base plates includes a central portion and a peripheral portion about a periphery of said central portion, and said central portion is thinner than said peripheral portion.

2. A polygon mirror as recited in claim 1, wherein said central portion of said one of said base plates is thinner than said peripheral portion of said one of said base plates in a direction perpendicular to said one of said attaching surfaces when said one of said base plates is not inclined relative to said one of said attaching surfaces.

3. A polygon mirror as recited in claim 2, wherein said polygon base has a central axis, and said attaching surfaces of said polygon base face radially outwardly away from said central axis.

4. A polygon mirror as recited in claim 1, wherein said reflecting direction adjusting mechanism comprises a bolt threaded through said one of said base plates, said bolt having a distal end which bears against said one of said attaching surfaces and a bolt head end located outwardly of said one of said base plates relative to said one of said attaching surfaces.

5. A polygon mirror as recited in claim 4, further comprising a fixing bolt threaded through said one of said base plates and threaded into said one of said attaching surfaces.

6. A polygon mirror as recited in claim 4, further comprising an elastic adhesive agent fixing said base plates to said total reflection mirrors, respectively.

7. A polygon mirror as recited in claim 6, wherein said elastic adhesive agent comprises silicon rubber.

8. A polygon mirror as recited in claim 1, wherein said reflecting direction adjusting mechanism comprises a thin plate interposed between said one of said attaching surfaces and said one of said base plates.

9. A polygon mirror as recited in claim 8, further comprising an elastic adhesive agent fixing said base plates to said total reflection mirrors, respectively.

10. A polygon mirror as recited in claim 9, wherein said elastic adhesive agent comprises silicon rubber.

11. A polygon mirror as recited in claim 1, further comprising an elastic adhesive agent fixing said base plates to said total reflection mirrors, respectively.

12. A polygon mirror as recited in claim 11, wherein said elastic adhesive agent comprises silicon rubber.

* * * * *